(12) United States Patent
Mandich et al.

(10) Patent No.: US 11,095,442 B1
(45) Date of Patent: Aug. 17, 2021

(54) GENERATING UNIQUE CRYPTOGRAPHIC KEYS FROM A POOL OF RANDOM ELEMENTS

(71) Applicant: QRYPT, INC., New York, NY (US)

(72) Inventors: Denis Mandich, New York, NY (US); Christopher Knapp, New York, NY (US); Austin Bradley, New York, NY (US); Samuel Wolfson, New York, NY (US); Matthew Neal, New York, NY (US)

(73) Assignee: QRYPT, INC., New York, NY (US)

( * ) Notice: Subject to any disclaimer, the term of this patent is extended or adjusted under 35 U.S.C. 154(b) by 31 days.

(21) Appl. No.: 16/375,921

(22) Filed: Apr. 5, 2019

(51) Int. Cl.
*H04L 29/00* (2006.01)
*H04L 9/08* (2006.01)

(52) U.S. Cl.
CPC .................. *H04L 9/0869* (2013.01)

(58) Field of Classification Search
CPC .................................. H04L 9/0869
USPC ......................................... 380/47
See application file for complete search history.

(56) References Cited

U.S. PATENT DOCUMENTS

| | | | |
|---|---|---|---|
| 1,310,719 A | 7/1919 | Vernam | |
| 5,412,729 A | 5/1995 | Liu | |
| 6,078,665 A | 6/2000 | Anderson et al. | |
| 6,324,287 B1 | 11/2001 | Angert | |
| 7,170,997 B2 * | 1/2007 | Petersen | G06F 7/586 380/263 |
| 7,236,592 B2 | 6/2007 | Coppersmith et al. | |
| 7,581,100 B2 | 3/2009 | Mizrah | |
| 7,813,503 B2 | 10/2010 | Campagna et al. | |
| 8,059,814 B1 | 11/2011 | Duane | |
| 8,130,949 B2 | 3/2012 | Pinder | |
| 9,204,296 B2 | 12/2015 | Jones | |
| 9,762,560 B2 | 11/2017 | Haynes et al. | |
| 9,946,810 B1 * | 4/2018 | Trepetin | G06F 17/10 |
| 10,019,235 B2 | 7/2018 | Nordholt et al. | |
| 2002/0076044 A1 * | 6/2002 | Pires | H04L 9/16 380/37 |
| 2002/0159588 A1 | 10/2002 | Kauffman et al. | |
| 2003/0149869 A1 | 8/2003 | Gleichauf | |
| 2003/0210783 A1 | 11/2003 | Filippi | |
| 2006/0177065 A1 | 8/2006 | Halbert | |
| 2012/0085806 A1 | 4/2012 | Lee et al. | |
| 2015/0288517 A1 | 10/2015 | Evans et al. | |

FOREIGN PATENT DOCUMENTS

| | | | |
|---|---|---|---|
| WO | 2012/154129 A1 | 11/2012 | |
| WO | WO-2012154129 A1 * | 11/2012 | ............ H04L 9/0618 |

* cited by examiner

*Primary Examiner* — Morshed Mehedi
*Assistant Examiner* — Michael D Anderson
(74) *Attorney, Agent, or Firm* — Troutman Pepper Hamilton Sanders LLP

(57) ABSTRACT

A system and method for encryption key generation by receiving a plaintext message having a fixed character length and receiving, from a source, a plurality of random number. A matrix is created from the plurality random numbers and has at least one of the number of rows or columns equal to or greater than the character length. An array that can be used as an encryption key or a seed for an encryption key is generated by selecting an initial element within the matrix, selecting subsequent elements using a selection technique until a number of elements in the array is equal to the character length and rejecting any previously selected elements from the array.

11 Claims, 6 Drawing Sheets

GENERATING UNIQUE CRYPTOGRAPHIC KEYS FROM A POOL OF RANDOM ELEMENTS

FIELD OF THE INVENTION

This invention relates to the generation and encryption of communications, their transmission over a communications network, and the receipt and decryption of the messages sent; and, more particularly, to the creation and use of unique keys.

BACKGROUND

Data stores and computing devices are increasingly the target of hackers and other security threats, including both witting and unwitting insiders. A basic defensive tactic is to encrypt all of this data and entire devices to render them useless and the data inaccessible if compromised or stolen. Many asymmetric and symmetric key-based encryption algorithms rely on the secure generation, distribution and storage of cryptographic keys. These cryptographic keys are used to reliably encrypt and decrypt data based on algorithms assessed to be hard and number generators considered to be truly random.

The advent of quantum computers has revealed two flaws in this approach. The mathematical hardness of most algorithms, particularly asymmetric encryption schemes, has no rigorous mathematical proof that it cannot be efficiently broken by advances in mathematics. Further, in most cases, most algorithms can easily be broken by a quantum computer with sufficiently large computing resources. The second flaw is most random number generators are not sampling true probabilistic events to generate provably random numbers. This problem has been solved by the development of quantum random number generators measuring fundamental quantum effects for each bit of random extracted. This has evolved into a new controversy over the "quantumness" of some technological claims. All modern electronics are quantum at some level, even though the randomness they generate would be considered classical noise. The risk is a quantum computer or advances in mathematical analysis could discover the pattern in this classical noise and predict the spectrum of keys produced.

Large random key generators from sources of classical or quantum entropy are an essential measure of security against quantum computers and other scientific advances impacting cryptography. In general, longer keys offer greater cryptographic strength for similar or analogous algorithms. Claude Shannon proved in 1949 the ideal solution is a Vernam cipher, also known as a one-time pad, where keys are as long as the plaintext requiring encryption and the plaintext is of arbitrary size. However, in practice, the cryptographic strength may vary and be tuned up to a one-time pad or something weaker like Advanced Encryption Standard (AES). In either case, appropriate length keys are necessary and must be supported by a disclosed generator design.

SUMMARY

It is an object of the present invention to provide systems, devices, and methods to generate, track and manage encryption keys. A set or pool of random elements can be a collection of numbers, symbols or any representation of unique elements that may be efficiently converted into binary digits. This random pool may be arbitrarily large and used as the basis for choosing or generating a subset of random numbers defined as the keys. The entire random pool may also be transformed to produce keys larger than the random set. In one embodiment, a set of X random elements may be organized into matrices M of A rows and B columns, where B is the number of elements in X divided by A, where A is greater than one. Using the entire set of X requires A and B to be integers or the extra elements of X may be not be used. A and B are adjustable parameters and may vary for any set X.

To encrypt plaintext of length L using a one-time pad (OTP), a key K of length L may be extracted from the matrix using several distinct procedures, individually or in tandem. A linear sequence or one-dimensional array J of length L may be selected from the first row of the matrix starting at any element I, including the first. If (B−I) is less than L, selection of the (B−I+1) element begins at the first column of A and continues sequentially until L is complete. The linear sequence J may be used as the OTP.

Additional sequences or keys K may be sampled from some or all of the rows in the matrix, beginning at the same column I or at random columns, varying row to row. These may be individually used as OTPs or they may be XORed together in total or in varying combinations of rows, to produce a single OTP of length L. Individual linear sequences may be non-sequentially selected from each row to produce a variety of combinations. For example, instead of choosing elements sequentially, every second or third element may be used to assemble the sequence J. This selection criteria may be randomized or based on known functions.

The random numbers may be generated from quantum entropy sources which produce keys from a verifiably random process. This is in contrast to pseudo-random number generators and non-quantum electronic noise sources of entropy which are deterministic at some level. There are no proofs or guarantees that advances in mathematics, computer science and physics will not reveal a reproducible pattern in these pseudo random systems.

This matrix system introduces randomization to classical random sources and preserves the quantum randomness of quantum random sources. Combining multiple random sources, both quantum and classical, to supply each row in a matrix or separate matrices which are later combined, is a natural extension of this system. More complex combinations including truncated keys and one-dimensional arrays of different sizes are also equally valid.

One example of the invention is method for encryption key generation which can have the steps of receiving a plaintext message comprising a fixed character length and receiving, from a source, a plurality of random numbers. A matrix can be created from the plurality random numbers having either or both of a number of rows and a number of columns equal to or greater than the character length. An array can be generated by selecting an initial element within the matrix, selecting subsequent elements using a selection technique until the number of elements in the array is equal to the character length; and rejecting any previously selected elements from the array.

The array generating step can include selecting the subsequent elements from one of the same row and the same column, where the row or the column used is the one with the dimension that is equal to or greater than the character length. In another example, the generating step can include wrapping back to the initial element in the one of the row or the column of the initial element once the final in that row or column is reached.

In other examples the selection technique can be selecting sequentially from the initial element or the array is selected from the row of the initial element using any predictable selection technique without reusing elements from any columns.

Additional arrays can be generated from the same row or column, and in one example a key or final array can be formed by XORing a plurality of the additional arrays to create a final array. Alternately, a plurality of matrices can be created, each used to generate a plurality of additional arrays and then XORing the plurality of additional arrays together to create a final array.

A system can also be used to implement the above method, the system having

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

DETAILED DESCRIPTION

Figure 1:
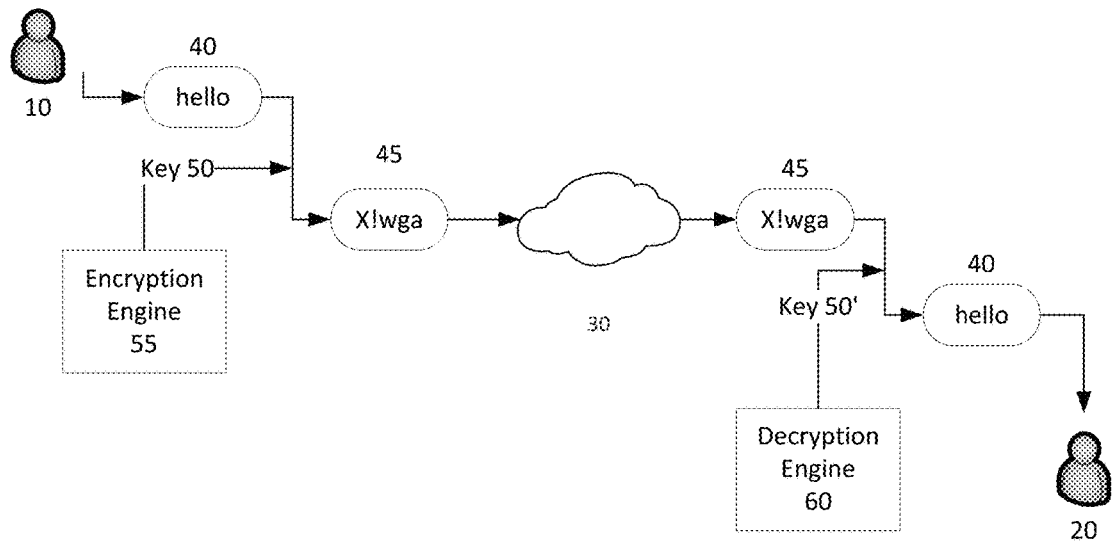
FIG. 1 illustrates an exemplary encrypted communication.

Generally, example devices, systems, and methods presented herein can allow secure end-to-end message transfer between communication devices over an unsecure channel, a basic configuration of which is illustrated in FIG. 1. Here, a first user 10 ("Alice") wants to send a communication to a second user 20 ("Bob") over an unsecured network 30 (e.g., the Internet). Alice 10 creates a plaintext message 40 which is encrypted into a secure message 45 by the use of an encryption key 50. This key 50 is generated by an encryption engine 55 either resident on Alice's hardware or supplied by a third-party. The encrypted text 45 is transmitted over the network 30, decrypted using a second key 50' and the plaintext 40 is available for Bob 20 to access. The second key 50' can be identical to the first key 50 or mathematically related (e.g. asymmetric keys) to decrypt the encrypted text 45. The communications between Bob 20 and Alice 10 can continue using the same keys, different keys, or any other key exchange to secure the plaintext 40. The present invention focuses on the generation of the keys to secure or authenticate any data exchange using any key exchange method. The system and method uses a one-time pad (OTP) methodology in which the length of the key is the same length as the plaintext which is the same length as the encrypted message.

Figure 2:
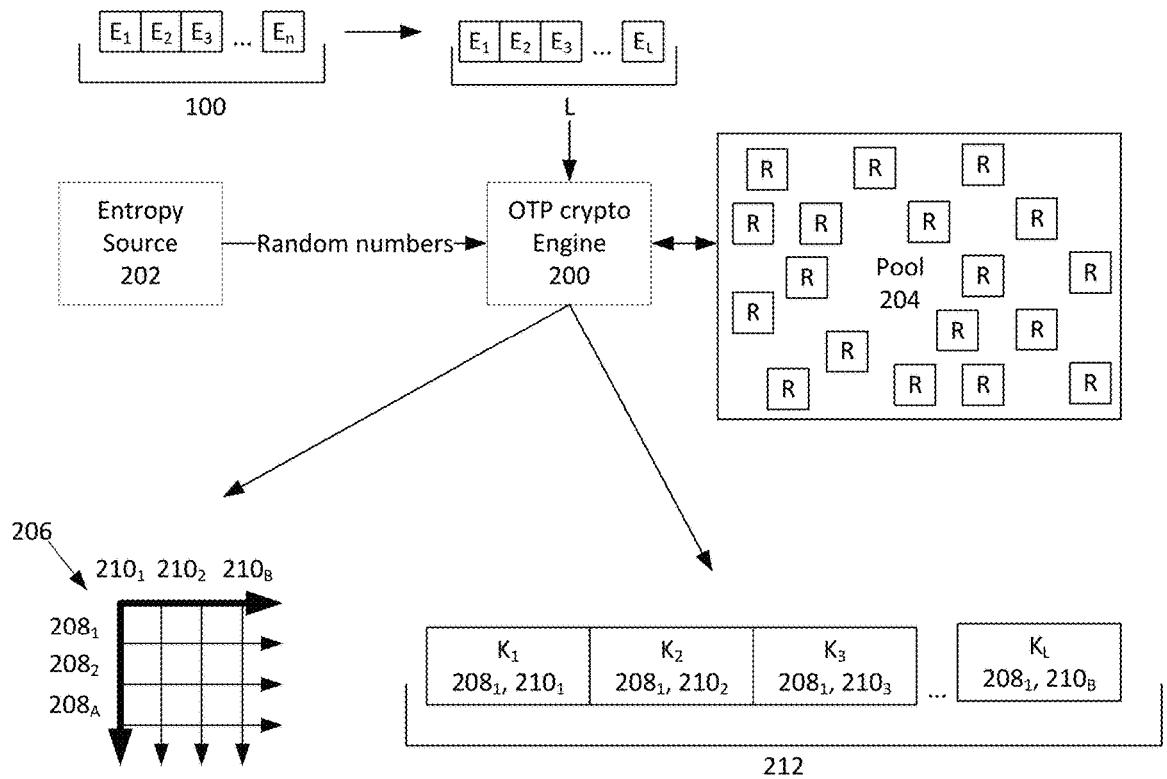
FIG. 2 is a block diagram illustrating an example of the system of the present invention.

FIG. 2 illustrates plaintext message 100 having n elements E. The number of elements n is the length L of the message. An OTP encryption/decryption (crypto) engine 200 receives the plaintext message 100 and begins the encryption process. Crypto engine 200 either generates or receives random numbers, preferably from quantum entropy sources 202. The quantum entropy sources 202 can be those as described in U.S. Pat. Nos. 9,425,954, 9,660,803 and U.S. application Ser. No. 16/288,722. Further, quantum or classical entropy sources, semi-quantum or random number generators can also be used and be generated by software, hardware or any combination thereof. Note while only one source 202 is illustrated, any number of sources can be used. Further, the random numbers R can be pooled 204 and retrieved at the time of encryption or called on demand and pooled. There can be X random numbers R.

Crypto engine 200 forms a matrix 206 of A rows 208 and B columns 210 from the random number pool 204. In this example, A×B<X and the dimensionality of matrix 206 may be determined by the encryption function at the beginning of any session. In one example, the matrix 206 is formed with a number B of columns 210 equal to or greater than the length of said character length L and the number A of rows 208 is at least 1. The matrix 206 can be populated linearly from pool 204 without using all of the random numbers R. The random numbers can also be "bits" and the extra bits may be selected at random or at discrete points in in the pool 204 and discarded. Matrix 206 may be square or non-square. The random elements populating each matrix 206 element, row 208 or column 210 can be done according to any prescribed method, sequential or otherwise. All elements Y of the pool 204 that exceed A×B elements, may be discarded or incorporated into the matrix through additional operations. For example, extra elements Y may be sequentially XORed into matrix 206 starting with the first or any element until all of Y is consumed. Any algorithmic method based on mathematical sequences or functions may be used to integrate the extra elements Y into the matrix 206 so all random numbers R in the pool 204 are used. The crypto engine 200 can form new pools 204 for each plaintext string 100 or reserve the random numbers Y in the pool 204 for later use.

Once the matrix 206 is formed, the crypto engine 200 can then form the key 212. In one example, the key 212 is formed from by creating a new one-dimensional array. The key array 212 can be created by selecting an initial element within the matrix 206 and selecting subsequent additional elements from the same row as said starting element. In other examples, depending on the initial element, the key 212 can be formed by wrapping back to the first element in the row of said initial element once the final column $210_B$ is reached. The key sequence is created from the matrix 206, until the number of elements in the new one-dimensional array 212 is equal to character length L of the plaintext message without reusing elements from any columns 210. In the illustrated example in FIG. 2, the key 212 is formed from the first row $208_1$ and starts at the first column $210_1$. Other examples include picking the key elements K for the key 212 from the matrix 206 using again only from the row 208 of the initial element and then using any predictable ordering or function without reusing elements from any columns 210. Thus, the sequence can be, as an example, $K1=(208_1, 210_2)$, ($208_1$, $210_3$), ($208_1$, $210_1$), ($208_1$, $210_B$), etc. until the key 212 is the same length as the plaintext length L.

Figure 3:
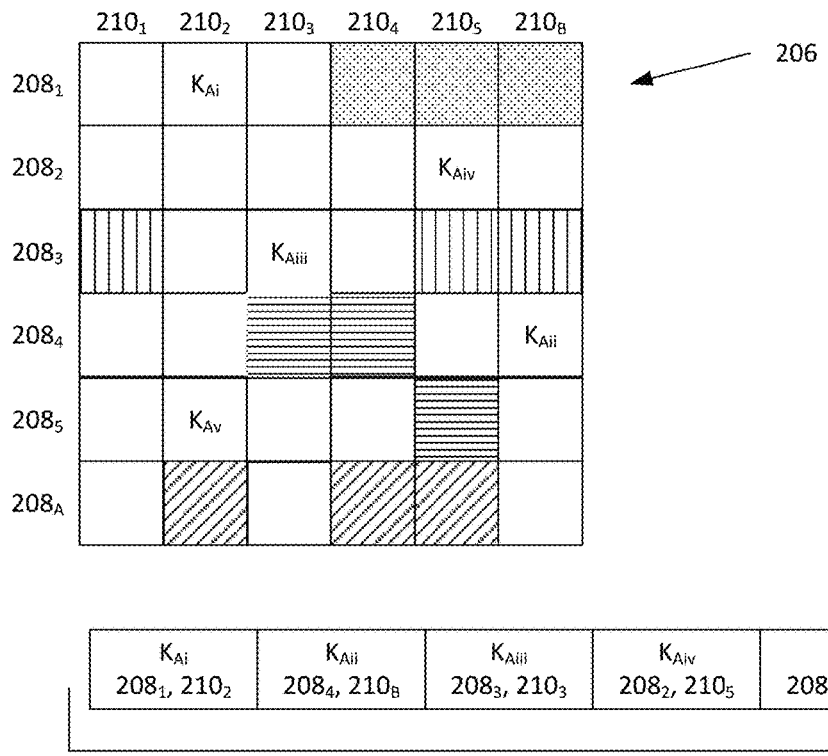
FIG. 3 illustrates different examples of patterns used to generate key sequences from a matrix.

FIG. 3 illustrates other examples of matrix 206 and the resulting key 312. Here, the key 312 (which can still be a one-dimensional array) is selected from any row 208 in the matrix 206 either sequentially or non-sequentially. So, in one example, a first key 312A can be created from the elements marked $K_{Ai}$ through $K_{Av}$, taken from multiple rows and out of sequence. Given the remaining elements in the matrix 206, additional keys 312 can be formed, as exemplified from the hatched areas using sequential or non-sequential techniques.

Figure 4A:
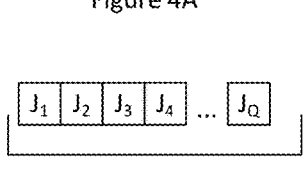
FIGS. 4A and 4B illustrate examples of intermediate sequences and generating key sequences from the intermediate sequences.

FIG. 4A illustrates forming an intermediate sequence 214 pulled from the matrix 206 using any of the above techniques. The sequence 214 can have Q elements and can be a one-dimensional array. The sequence 214 can be sampled or assembled from elements of the matrix 206. The sequence 214 may also be used as the key 212 or used as the random elements for creating daughter matrices 212' and/or additional sequences 214' of any dimension. The length Q of the sequence 214 can determined by the required key size or, in the case of OTP based systems, the size of the plaintext L requiring encryption, with a one-to-one correspondence (e.g. Q=L). Once the size Q of the sequence 214 is calculated, additional operations and transforms may be applied prior to incorporation into an encryption key or XORing with other sequences 214.

Figure 4B:
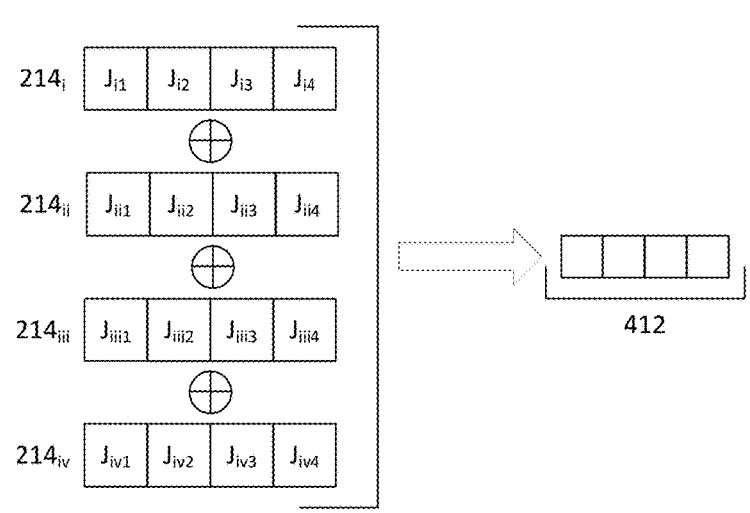

FIG. 4B illustrates a set of arrays/sequences 214 may be XORed together to produce a final key sequence 412 of length L. The individual sequences $214_i$-$214_{iv}$ may all be of the same length or they may be varied. If the sequences 214 are of nonuniform length, they may be concatenated, padded or additional linear operations may be applied to achieve all sequences 214 of the same length Q. These operations apply equally when the length of the key sequence 412 is less than the length of the intermediate sequences 214. Meaning, in one example, all sequences 214 must be decreased to the length of the key sequence 412 prior to the XOR application on the set of sequences 214. Additional operations are valid on any individual sequences 214 or as intermediate steps to the XOR operation to achieve the final key sequence 412. For example, the first sequence $214_i$ may be individually XORed with a private key unique to every user in a multiparty encryption key system. Additional elements may be appended or added to every sequence 214 prior to generating the key sequence 412.

Additional examples of generating both key sequences 212 and intermediate sequences 214, FIG. 3 illustrates both sequential and non-sequential ordering. Non-sequential patterns can order the elements E from each row, every second, third or any predictable, regular or random column ordering. When generating the sequences 212, 214, any element A in rows 208 may only be used once, meaning, each element must be considered consumed before selecting the next element in the sequence 212, 214. The application of functions or known sequences may be iteratively applied to the same row 208 after placing an element A from that row 208 into the sequence 212, 214, for example. Each step used to populate the sequence 212, 214 is effectively diminishing the available elements A in the row 208 to choose from. Additional mixing or concatenation functions can be applied to the remaining elements A in row 208 prior to selecting the next element of the sequence 212, 214. A sequential example is in row $208_1$, a wrap-around sequence in row $208_3$, and non-sequential patterns in rows $208_4$ to $208_A$.

Another example of generating a sequence 212, 214 utilizes the entire pool 204 of random numbers R. In this example, there are Y excess random numbers. The entire pool 204 can be transformed to produce sequences 212, 214 larger than the pool set X. In one example, the set of X random elements can be organized into one or more matrices 206 of A rows 208 and B columns 210, where B is the number of elements in X divided by A and where A is greater than one. Using the entire set of X random elements requires A and B to be integers or the extra elements Y of the full pool set X may be not be used. Row and column lengths A and B are adjustable parameters and may vary for any set X.

To encrypt plaintext 100 of length L using a one-time pad (OTP), a key 212 of length L may be extracted from the matrix 206 using several distinct procedures, individually or in tandem. A linear sequence or one-dimensional array 212, 214 of length L may be selected from the first row of the matrix starting at any element i including the first. If (B−i) is less than L, selection of the (B−i+1) element begins at the first column 210 of that row 208 and continues sequentially until L is complete. The linear sequence 212, 214 may be used as the OTP.

Figure 5:
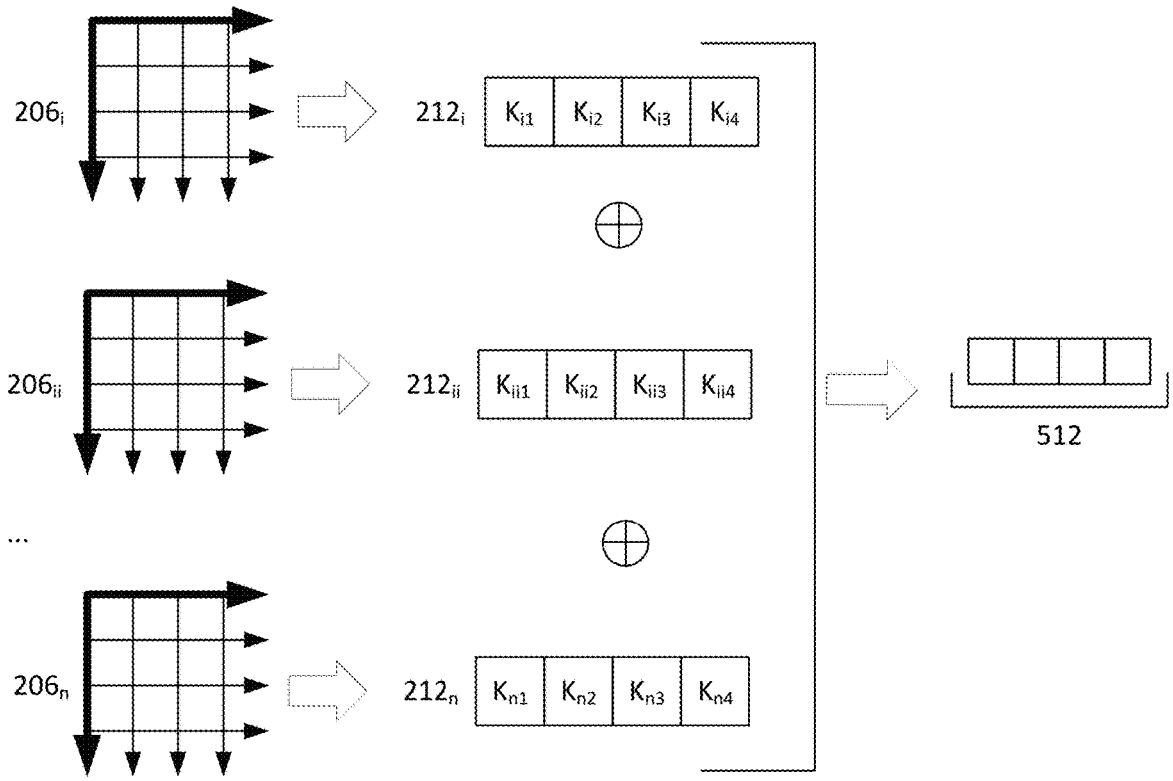
FIG. 5 illustrates examples generating multiple keys and a final key.

FIG. 5 illustrates the sequence concept at the matrix 206 and key set 212 level. Multiple matrices $206_i$-$206_n$ of various dimensions may be individually created from the random pool 204, or from a series of sequences 214 manipulated out of a previous matrix 206. Each matrix 206 producing a key 212, which in turn can be XORed together to produce a final key 512 or OTP used for encryption.

The classical or quantum entropy sources 202 used to generate the pool 204 can each be associated with an individual matrix 206 or several matrices 206, each correlated with an individual random number generator or any combination. Although the pool 204 is effectively a large pool of random numbers R, the pool 204 can be subdivided into smaller sets with complex relationships to their entropy origin, quantum or classical. These may be used to generate the plurality of matrices 206 prior to producing the individual key sets 212 correlated with each matrix 206. The key set 212 produced from each matrix 206 may be of uniform or nonuniform length prior to XORing into a final key set 512, analogous to using individual sequences 214.

Figure 6:
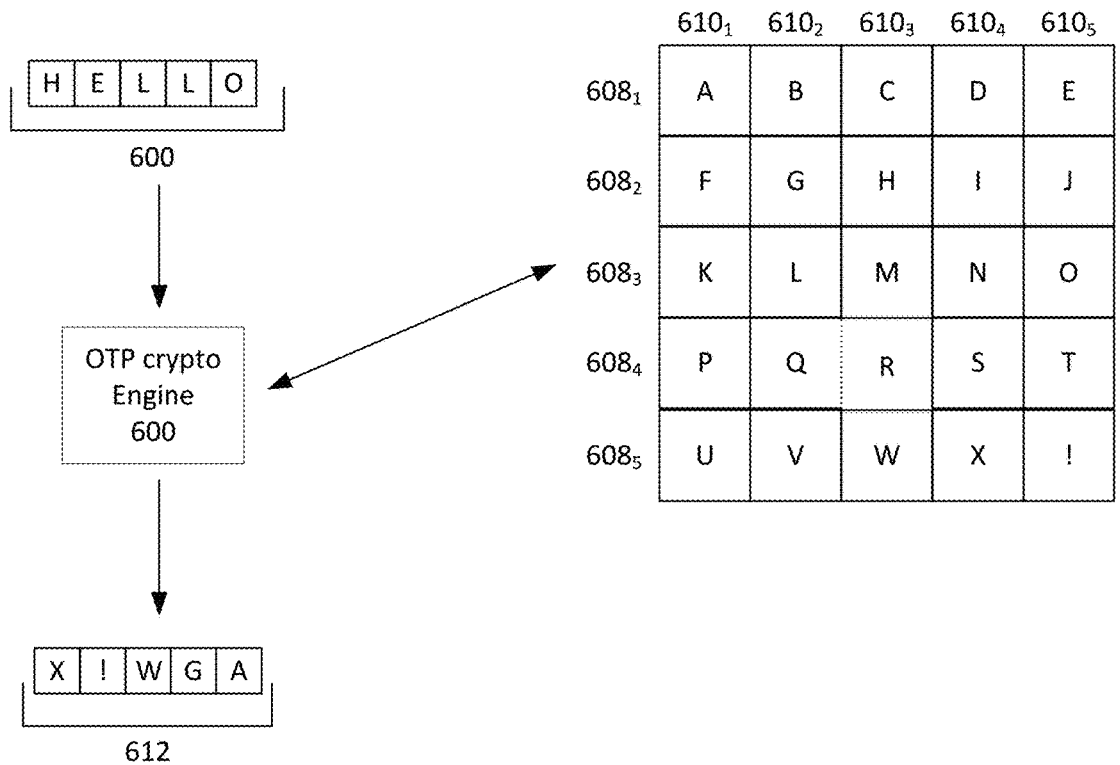
FIG. 6 illustrates an example of encrypting an exemplary encrypted communication.

FIG. 6 illustrates an example where the plaintext 600 is "hello". The plaintext character length L is 5 and thus n=5. In the illustrated example, the crypto engine 600 forms a matrix 606 as a square matrix where the number of rows 608 and columns 610 are equal and thus A=L, B=L and is thus a 5×5 matrix 606. The crypto engine 600 draws the random elements from the pool to form the matrix 606. A simple substitution key 612 is formed from a non-sequential selection from the matrix 606. A sequential key 612 could be "FGHIJ" from row $608_2$, while a single array non-sequential key can be "KMOLN" from row $608_3$.

Figure 7:
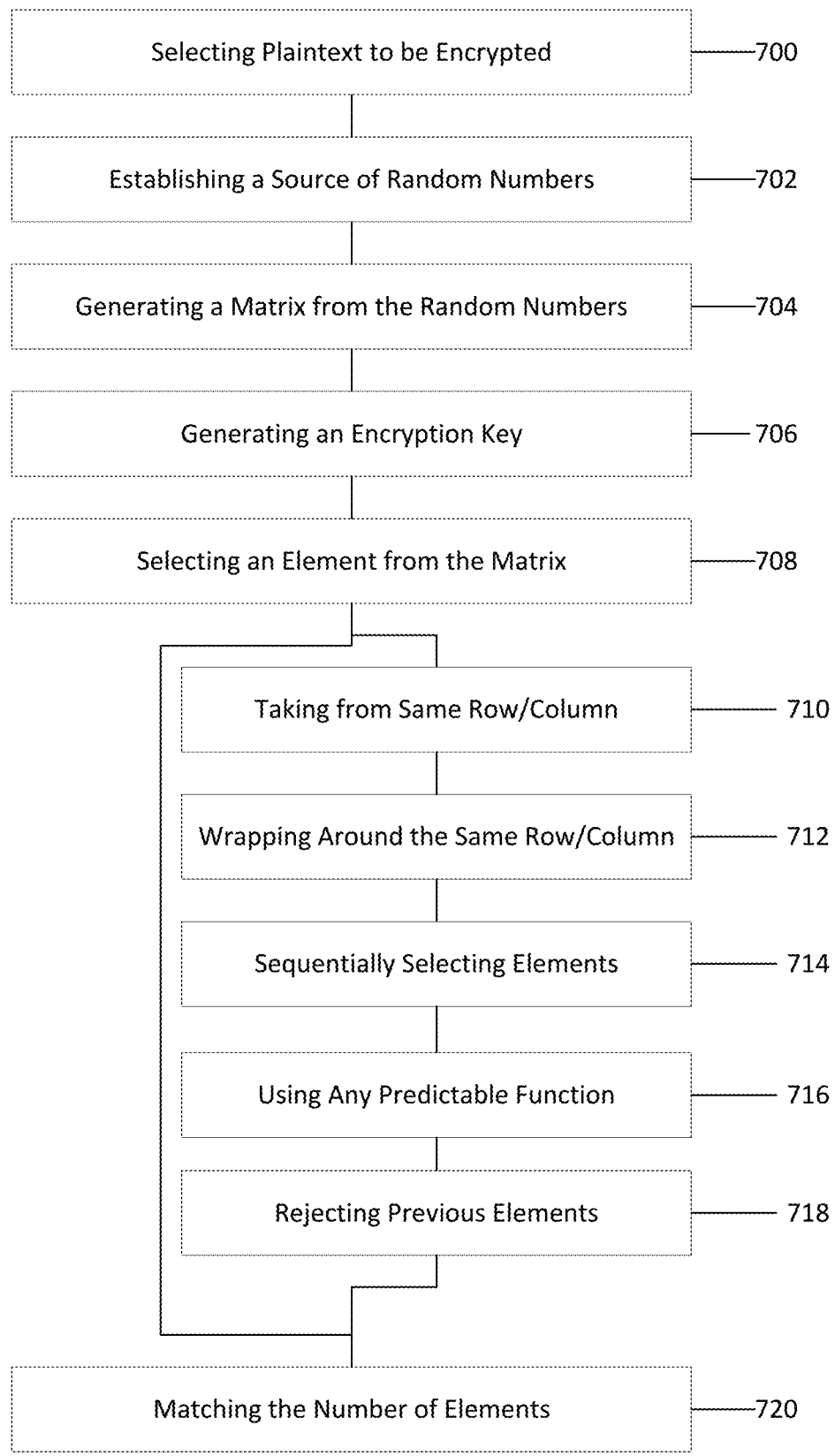
FIG. 7 is an example of a method of encrypting an exemplary communication.
Figure 8:
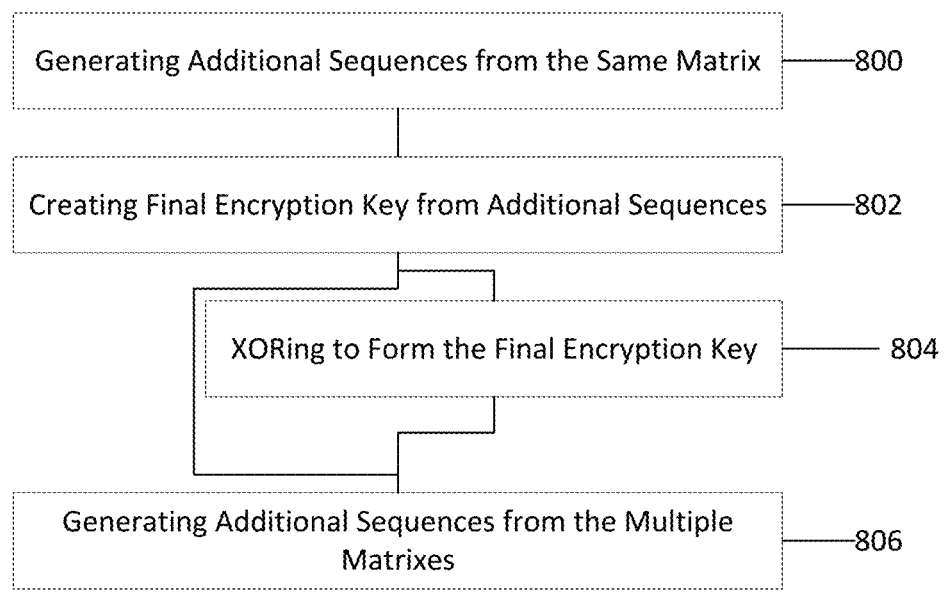
FIG. 8 illustrates additional examples of a method of encrypting a communication.

FIGS. 7 and 8 illustrate different methods for computer-implemented encryption key generation. Herein any computational device can include, but is not limited to, general purpose computers and servers, field programmable gate arrays (FPGA), processor arrays and networks, dedicated application specific integrated circuits (ASIC) and virtual machines (VM), etc. Specific devices can also include portable electronic devices such as a cellular telephone, tablet computer, laptop computer, and the like. In some examples, a computer system can be provided that can include a processor and a non-transient memory that stores computer-executable instructions that when executed by the processor, the processor can perform various operations including manipulating, recording, expanding, and aggregating random numbers from entropy sources into a pool, creating a matrix with such aggregate random numbers, creating key or intermediate sequences, and distributing the sequence. This can be performed by a single device (e.g. system on a chip in a mobile or field deployed device) or across a network. Several of such computer systems can be assembled in groups of systems creating a larger network structure of individual nodes that can be physical or virtualized.

FIG. 7 illustrates an example of a method including selecting a plaintext to be encrypted, wherein said plaintext has a fixed character length (step 700). Establishing a source of random numbers from a single or plurality of hardware and or software entropy sources (step 702) and generating a matrix from said random numbers (step 704). As above, the single or plurality of hardware or software sources 202 can be quantum random number generators.

As noted above, the matrix 206, 606 can be a two-dimensional array and can have a number B of columns 210, 610 equal to or greater than the length L of the plaintext message 100. Note in all examples, while the number B of columns 210, 610 can equal the plaintext length L, and the number A of rows 208, 608 can be 1. The reverse can also be true, wherein the number A of rows is equal to or greater than the plaintext length L and the number B of columns 210, 610 is equal to 1. Thus, at least one dimension A, B of the matrix 206, 606 can be equal to or greater than the plaintext length L. As an example, turning back to FIG. 6, a possible key can be "CHMRW" taken from multiple rows 608 that are part of column $610_3$.

Turning back to FIG. 7, the method can include generating an encryption key 212, 512, 612 or intermediate sequence 214 or a one-time pad (step 706). This can be created with a new one-dimensional array key sequence 212, 512, 612 or intermediate sequence 214 by selecting an initial element $K_i$, $J_i$ within the matrix 206, 606 and selecting subsequent additional elements $K_n$, $J_n$ from the matrix 206, 606 (step 708).

The selecting step 708 can include sub-steps of taking the initial element $K_i$, $J_i$ from the same row or column as the starting element (step 710) and/or wrapping back to the first element $K_i$, $J_i$ in the row or column of the initial element $K_i$, $J_i$ once a final row or column is reached (step 712). Other sub-steps include sequentially selecting subsequent elements after the initial element $K_i$, $J_i$ (step 714) or selecting from the row or column the initial element $K_i$, $J_i$ using any predictable ordering or function (step 716). Another step can be rejecting previously used elements from the matrix (step 718) or said differently, the new one-dimensional array/key sequence/intermediate sequence is created is without reusing elements from any rows and/or columns.

Further steps include matching the number of elements $K_n$, $J_n$ in the new one-dimensional array/key sequence 212, 512, 612 or intermediate sequence 214 to be equal to the plaintext character length L without reusing elements from any columns or rows (step 720).

FIG. 8 illustrates further examples of methods stemming from the previous steps where selecting the new one-dimensional array/key sequence 212, 312, 512, 612/intermediate sequence 214 is from any row/column 208, 210 in the matrix 206 to generate additional encryption keys 212 (step 800). Other examples can then use a plurality of new one-dimensional arrays/key sequences 212, 612/intermediate sequences 214 to create a single final encryption key sequence 512 or one-time pad (step 802). The new one-dimensional array/key sequence 212, 512, 612/intermediate sequence 214, as above, can be generated from the matrix 206, 606 using single or multiple sequential or non-sequential techniques. These new arrays/sequences can be XORed together to form the final key sequence 512 (step 804). New arrays/sequences can be generated from a plurality of matrices $206_n$ and in one example, the plurality of matrices each generate at least one new one-dimensional array/sequence (step 806). As above, the new arrays/sequences can be subsequently XORed together to create a single final one-dimensional array/sequence as the new encryption key 512 or OTP.

Figure 9:
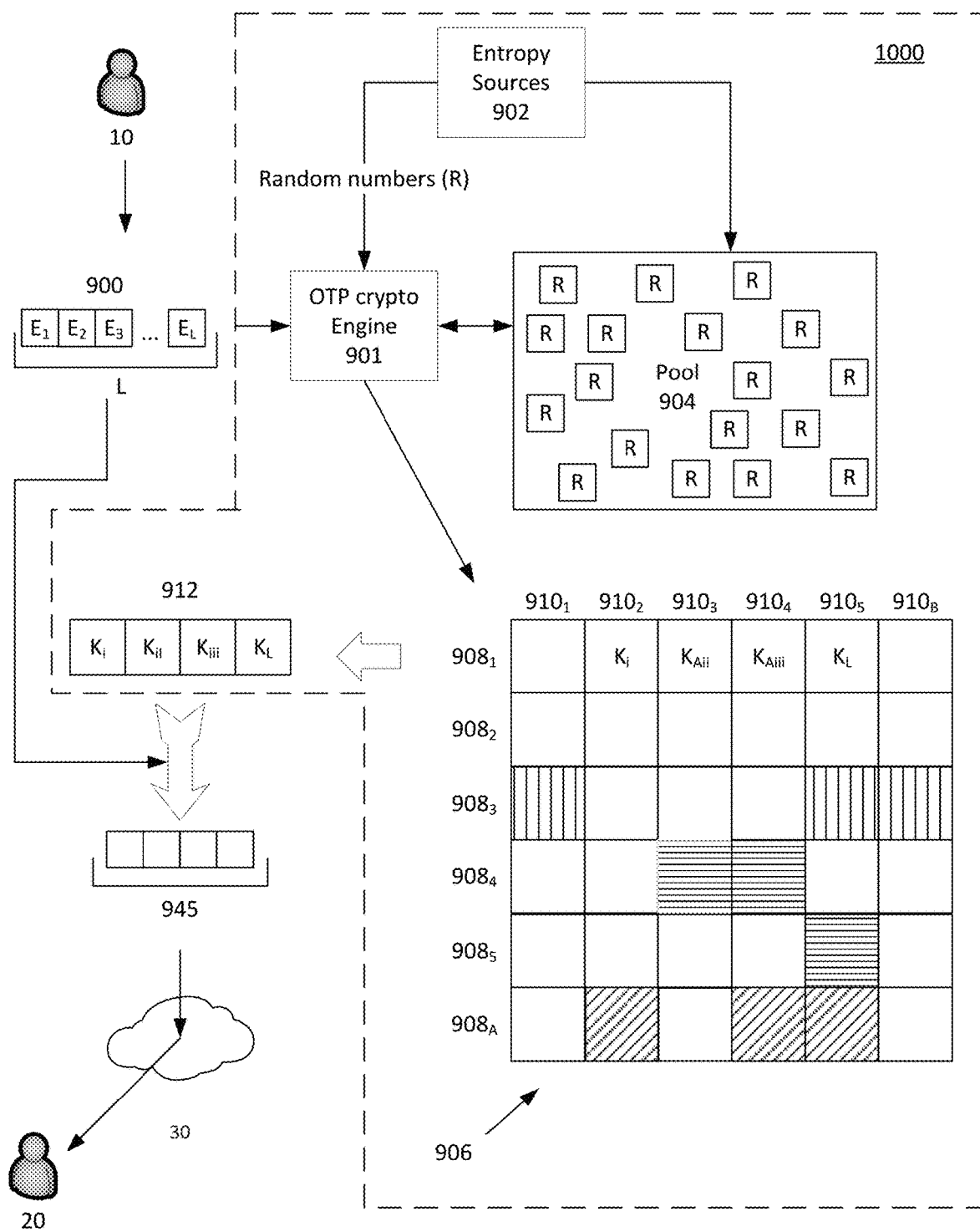
FIG. 9 illustrates another example of a system to encrypt communications according to the present invention.

FIG. 9 illustrates an example of a system 1000 for computer-implemented encryption key generation. A plaintext message 900 is received by the system 1000 for encryption and the plaintext 900 has a fixed character length L. The crypto engine 901 accesses one or more entropy/random number sources 902 to receive random numbers R. The entropy/random number sources 902 can be based in hardware or software or a combination of both. The random numbers can be pooled 904 either at the time of access or in advance. Alternate examples do not pool, but the accessed random numbers R are used directly to form a matrix. The matrix 906 can be created from a set of random numbers generated from the random number sources 902 and can have number A of rows 908 and/or a number B of columns 910 equal to or greater than the plaintext character length L. The system 1000 creates an encryption key 912 (which can be used for a one-time pad) from the matrix 906. The encryption key 912 can be a one-dimensional array commencing from an initial element $K_i$ within said matrix and continuing with subsequent additional elements until the length of the key is at least equal to the character length L. In an example, the remaining key elements $K_n$ can be extracted from the same row 908 or column 910 as the starting element $K_i$, including wrapping back to the first element in the row 908 or column 910 once the final row/column is reached. Other hatching in the illustration of the matrix 906 represents different key generation techniques, as discussed above. The number of key elements $K_n$ in the key sequence 912 can be equal to said plaintext character length L without reusing elements from any matrix row 908 or column 910. The key 912 is then applied to the plaintext message 900 to form the encrypted message 945. The encrypted message 945 can then be transmitted. In one example, Alice 10 types the plaintext message 900 to send to Bob 20 over a network 30 (unsecured or otherwise). The system 1000 can contain all of the elements needed to receive the plaintext input from Alice 10 and transmit it to Bob 10, or only the elements needed to encrypt/decrypt the message 945.

The use of the key 912 by Bob 20 to then decrypt the message 945 can be though a number of known means. The key 912 can be passed to Bob 20 in any known prior art method for his use. Alternately, both Alice 10 and Bob 20 can share the matrix 906 and only Alice's and Bob's systems 1000 know which technique (single or multiple, sequential or non-sequential) to use to form the key 612 from the matrix 906. The matrix 906 can be passed in the clear or encrypted using a different key.

In other examples, the single or plurality of hardware or software random number sources 902 can be quantum random number generators. Subsequent additional elements for the key or intermediate sequences 912 can be selected sequentially in that the new one-dimensional array is selected sequentially from the initial element $K_i$. The new one-dimensional array can be selected from the row or column of the initial element $K_i$ using any predictable ordering or function without reusing elements from any row and/or column. The new one-dimensional array can be selected from any row and/or column in said matrix to generate additional encryption keys. Another example is that the plurality of new one-dimensional arrays can be generated from the matrix using a single sequential or non-sequential technique, and the new one-dimensional arrays can be XORed together to create a single final one-dimensional array as the new encryption key or one-time pad. Instead of a single matrix, a plurality of matrices each generate new one-dimensional arrays, wherein said new one-dimensional arrays are subsequently XORed together to create a single final one-dimensional array as the new encryption key or one-time pad.

Further, the matrix can have any number of dimensions (one, two, three, etc.) and at least one of the dimensions, in certain examples, equals the plaintext character length. This also holds true for the both the intermediate and key sequences.

The descriptions contained herein are examples of embodiments of the invention and are not intended in any way to limit the scope of the invention. As described herein, the invention contemplates many variations and modifications of an encryption system, including random number generation, collection, pooling, matrix generation, and sequence generation, additional control functionality, additional communication functionality, additional functionality to meet end user needs not specifically described herein, additional and/or alternative random number sources, additional and/or alternative schemes and means for generating random bit streams, additional and/or alternative schemes for encrypting and/or encapsulating random numbers for secure transfer over an unsecure network, additional and/or alternative schemes for creating virtual entropy sources, etc. These modifications would be apparent to those having ordinary skill in the art to which this invention relates and are intended to be within the scope of the claims which follow.

What is claimed is:

1. A method for encryption key generation, comprising the steps of:
   receiving a plaintext message comprising a fixed character length;
   generating, from a source, a plurality of random numbers;
   pooling the plurality of random numbers for future access;
   creating an entire matrix from the pool of the plurality random numbers, comprising at least one of a number of rows and a number of columns that are at least one of equal to and greater than the character length;
   retaining a subset of the plurality of random numbers in the pool after the creating step;
   generating one or more arrays, comprising the step of:
      selecting an initial element within the matrix,
      selecting subsequent unique elements using a selection technique until a number of elements in each array is respectively equal to or greater than the character length,
      wrapping back to a first element in the one of the row or column of the initial element once a final element in that row or column is reached, and
      truncating each array greater than the character length so that each array is equal to the character length by rejecting previously selected elements from the array; and
   creating the encryption key based on the one or more arrays.

2. The method of claim 1, wherein the generating step further comprises the step of selecting the subsequent elements for a given array of the one or more arrays from one of the same row and the same column, wherein the row or the column used is at least the one with the dimension that is equal to or greater than the character length.

3. The method of claim 1, wherein the selection technique comprises selecting sequentially from the initial element.

4. The method of claim 1, wherein the array is selected from the row of the initial element.

5. The method of claim 1, further comprising the steps of XORing the arrays to create the encryption key, the one or more arrays comprising a plurality of arrays.

6. The method of claim 1, further comprising the step of:
   creating a plurality of matrices, each used to generate a plurality of additional arrays; and
   XORing the plurality of additional arrays together to create a final array.

7. A system for encryption key generation, comprising:
   a plaintext message comprising a fixed character length;
   a random number source generating a plurality of random numbers;
   a non-transient memory configured to act as a pool, storing the plurality of random numbers for future use;
   a matrix created entirely from the pool of the plurality of random numbers comprising a number ("A") of sequential rows and a number ("B") of sequential columns, wherein at least one of A and B are equal to or greater than the character length, wherein the pool contains more random numbers than is needed to create the matrix;
   one or more truncated arrays each comprising:
      an initial element from matrix selected from an $i^{th}$ row and a $j^{th}$ column of the matrix;
      an $n^{th}$ subsequent element from the matrix selected from either the $i^{th}$ row and $B^{th}$ column or the $A^{th}$ row and $j^{th}$ column; and
      an $(n+1)^{th}$ subsequent element from the matrix selected from either the $i^{th}$ row and $1^{st}$ column or the $1^{st}$ row and the $j^{th}$ column;
      a length truncated to be equal to the character length; and
      wherein the elements are not repeated from the matrix; and
   an encryption key based on the one or more arrays.

8. The system of claim 7, wherein, for at least one of the truncated arrays, the $n^{th}$ and $(n+1)^{th}$ subsequent elements further comprise:
   elements from the same row as the initial element.

9. The system of claim 7, wherein the random number source comprises:
   a plurality of random number sources based in at least one of hardware or software; and
   a quantum random number generator.

10. The system of claim 7, wherein, for at least one of the truncated arrays, the $n^{th}$ and $(n+1)^{th}$ subsequent elements further comprise:
    elements from the same column as the initial element.

11. The system of claim 7, wherein the encryption key is formed from mathematical operations on the arrays, the one or more arrays comprising a plurality of arrays.

* * * * *